(12) United States Patent (10) Patent No.: US 11,264,630 B2
Schaffer-Harris et al. (45) Date of Patent: Mar. 1, 2022

(54) PROCESS FOR PREPARING A SUPPORTED CATALYTIC MATERIAL, AND SUPPORTED CATALYTIC MATERIAL

(71) Applicant: OKINAWA INSTITUTE OF SCIENCE AND TECHNOLOGY SCHOOL CORPORATION, Okinawa (JP)

(72) Inventors: Geoffrey Kellogg Schaffer-Harris, Okinawa (JP); Viacheslav Fedorovich, Okinawa (JP); Igor Goryanin, Okinawa (JP); Lukasz Michal Szydlowski, Okinawa (JP); David James Wilpault Simpson, Okinawa (JP); Georgy Filonenko, Eindhoven (NL)

(73) Assignee: OKINAWA INSTITUTE OF SCIENCE AND TECHNOLOGY SCHOOL CORPORATION, Okinawa (JP)

( * ) Notice: Subject to any disclaimer, the term of this patent is extended or adjusted under 35 U.S.C. 154(b) by 342 days.

(21) Appl. No.: 16/480,848

(22) PCT Filed: Feb. 27, 2018

(86) PCT No.: PCT/JP2018/007294
§ 371 (c)(1),
(2) Date: Jul. 25, 2019

(87) PCT Pub. No.: WO2018/159622
PCT Pub. Date: Sep. 7, 2018

(65) Prior Publication Data
US 2019/0393532 A1 Dec. 26, 2019

Related U.S. Application Data

(60) Provisional application No. 62/464,736, filed on Feb. 28, 2017.

(51) Int. Cl.
*H01M 8/16* (2006.01)
*B01J 27/24* (2006.01)
(Continued)

(52) U.S. Cl.
CPC ............... *H01M 8/16* (2013.01); *B01J 27/24* (2013.01); *B01J 35/0033* (2013.01); *B01J 37/082* (2013.01); *H01M 4/9083* (2013.01)

(58) Field of Classification Search
CPC ...... B01J 27/24; B01J 35/0033; B01J 37/082; H01M 4/9083; H01M 8/16
(Continued)

(56) References Cited

U.S. PATENT DOCUMENTS 4,142,993 A * 3/1979 Elofson .................... B01J 23/58
423/363
4,839,327 A 6/1989 Haruta et al.
(Continued)

FOREIGN PATENT DOCUMENTS

CN 10 3318872 * 9/2013 ............ B82Y 30/00
CN 103318872 9/2013
(Continued)

OTHER PUBLICATIONS

International Search Report dated Apr. 24, 2018 in International (PCT) Application No. PCT/JP2018/007294.
(Continued)

*Primary Examiner* — Patricia L. Hailey
(74) *Attorney, Agent, or Firm* — Wenderoth, Lind & Ponack, L.L.P.

(57) ABSTRACT

The present invention relates to a process for preparing a supported catalytic material, wherein the said process comprises a step of heating a precursor of support material which has been impregnated with a mixture of chemical precursors, wherein the said mixture includes a nitrogen-containing
(Continued)

reducing reagent as a precursor and a transition-metal-containing compound as a precursor.

17 Claims, 7 Drawing Sheets

(51) Int. Cl.
*B01J 35/00* (2006.01)
*B01J 37/08* (2006.01)
*H01M 4/90* (2006.01)

(58) Field of Classification Search
USPC .......................................... 502/185; 429/401
See application file for complete search history.

(56) References Cited

U.S. PATENT DOCUMENTS

| | | | |
|---|---|---|---|
| 2005/0176989 A1* | 8/2005 | Coleman | B01J 35/1028 562/11 |
| 2005/0176990 A1* | 8/2005 | Coleman | B01J 23/8913 562/11 |
| 2009/0130502 A1* | 5/2009 | Liu | H01M 4/9083 429/483 |
| 2010/0048380 A1* | 2/2010 | Calabrese Barton | H01M 4/881 502/5 |
| 2011/0287174 A1* | 11/2011 | Calabrese Barton | H01M 4/8652 427/115 |
| 2012/0273711 A1 | 11/2012 | Guo et al. | |
| 2014/0036201 A1 | 2/2014 | Kanno et al. | |
| 2014/0099571 A1* | 4/2014 | Proietti | H01M 4/8828 429/527 |
| 2015/0086727 A1 | 3/2015 | Wang et al. | |
| 2015/0224484 A1* | 8/2015 | Kim | C07C 37/002 549/401 |
| 2015/0263353 A1 | 9/2015 | Serov et al. | |
| 2016/0181621 A1* | 6/2016 | Serov | H01M 4/9083 429/532 |
| 2016/0240861 A1 | 8/2016 | Kurungot et al. | |
| 2017/0054154 A1 | 2/2017 | Wang et al. | |

FOREIGN PATENT DOCUMENTS

| | | | | |
|---|---|---|---|---|
| CN | 10 5932309 | * | 9/2016 | ............. B82Y 30/00 |
| CN | 105932309 | | 9/2016 | |
| JP | 2006-289326 | | 10/2006 | |
| JP | 2014-169239 | | 10/2014 | |
| JP | 2016-37404 | | 3/2016 | |
| JP | 2016-38988 | | 3/2016 | |
| WO | 2014/062639 | | 4/2014 | |
| WO | 2015/059718 | | 4/2015 | |

OTHER PUBLICATIONS

Written Opinion of the International Searching Authority dated Apr. 24, 2018 in International (PCT) Application No. PCT/JP2018/007294.
Extended European Search Report dated Jan. 28, 2020 in corresponding European Patent Application No. 18760251.1.
Yang et al., "Bamboo-like Carbon Nanotube/$Fe_3C$ Nanoparticle Hybrids and Their Highly Efficient Catalysis for Oxygen Reduction," Journal of The American Chemical Society, Jan. 2015, vol. 137, pp. 1436-1439.

* cited by examiner

[Fig. 1]
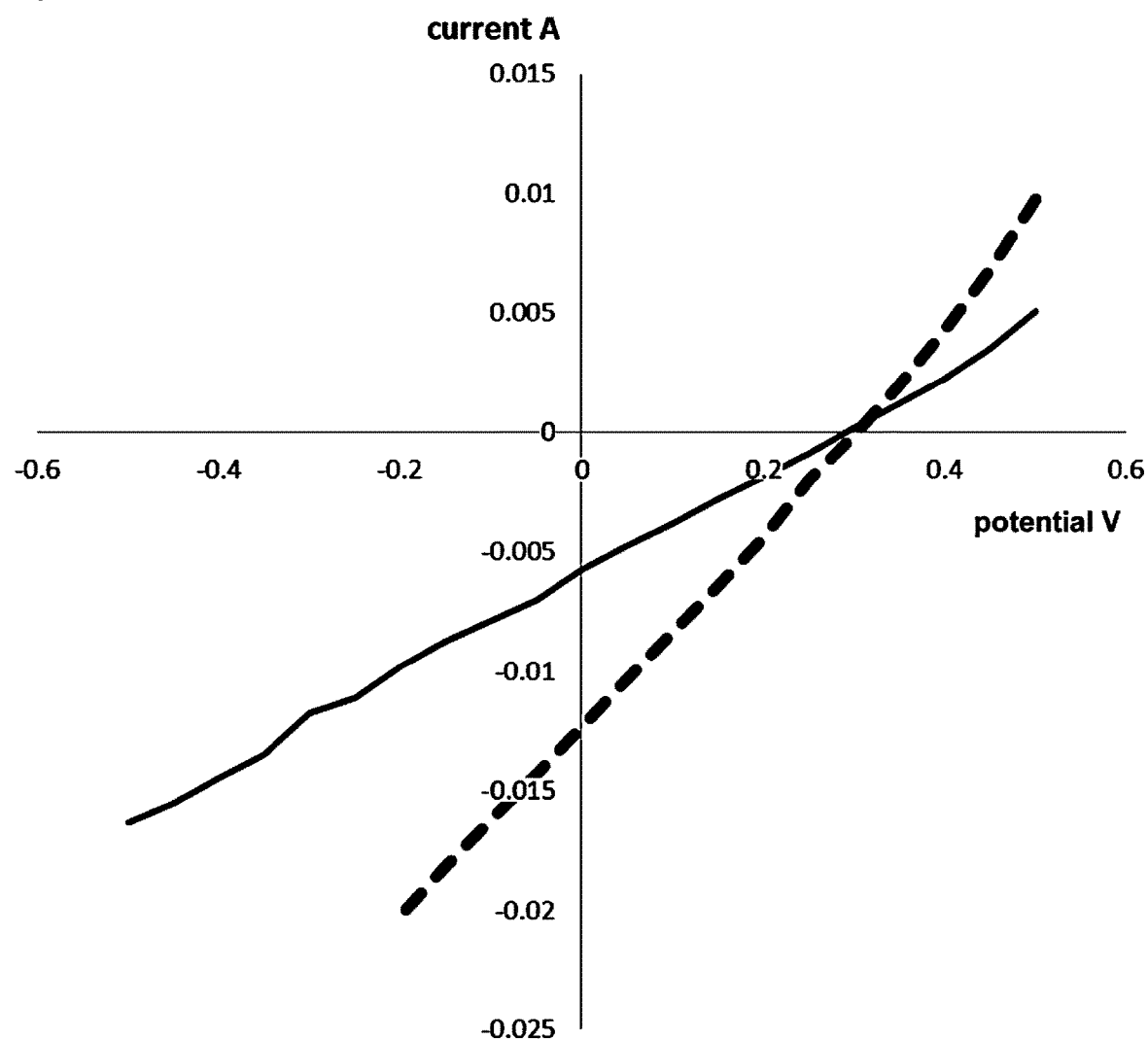

[Fig. 2]
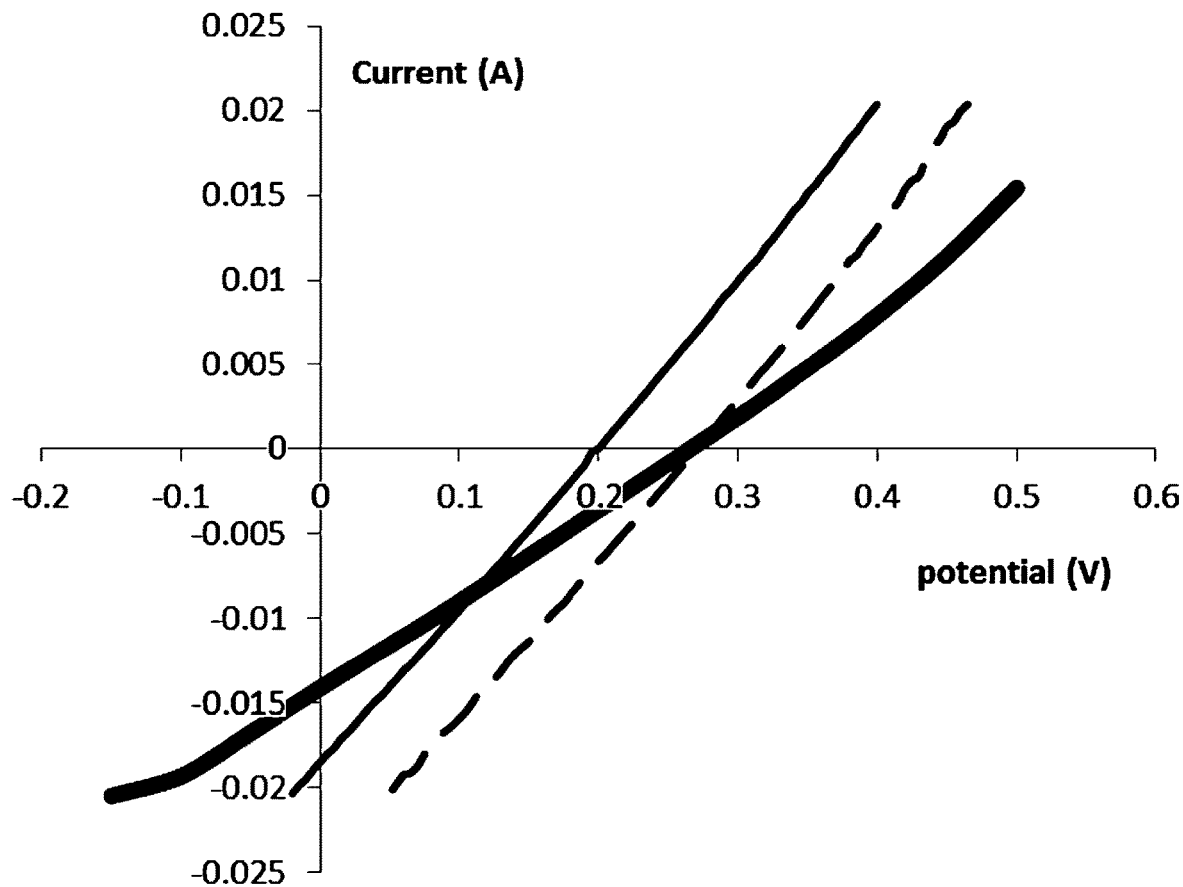
[Fig. 3]
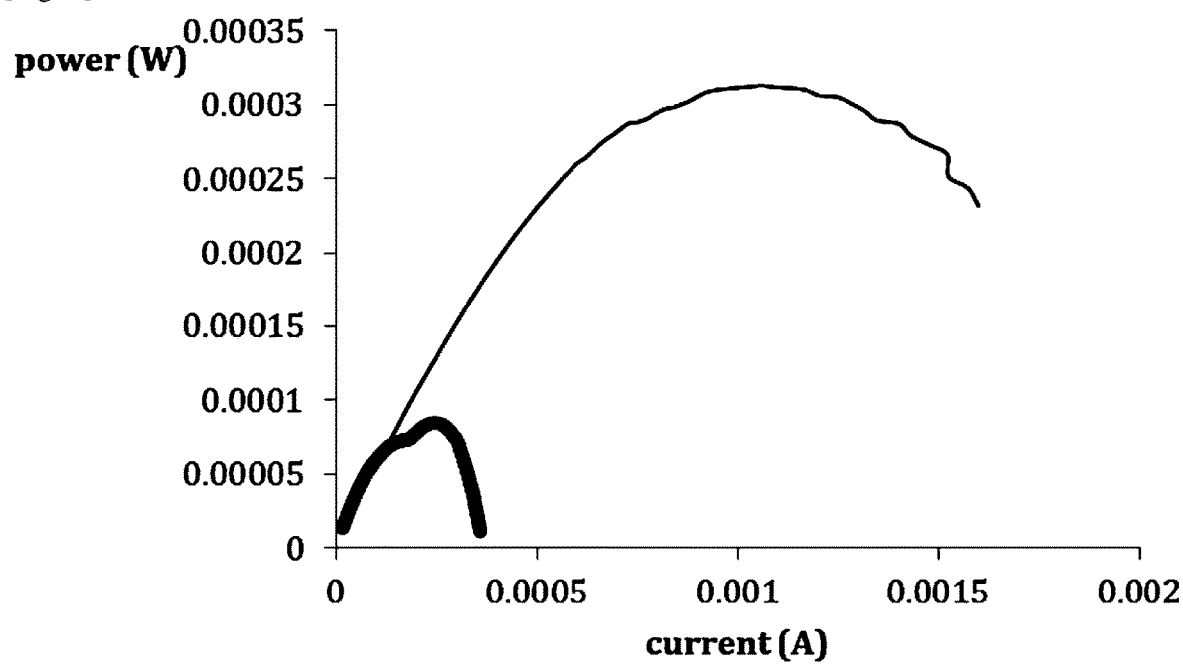

[Fig. 4]
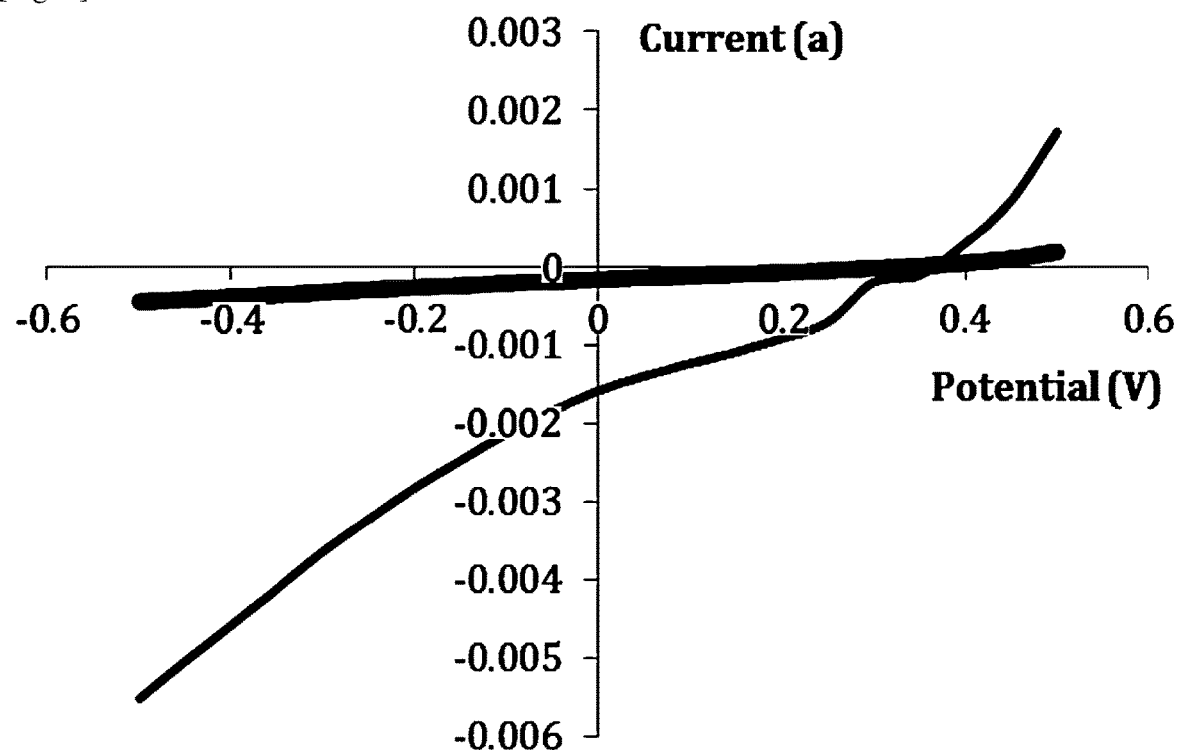

[Fig. 5A]
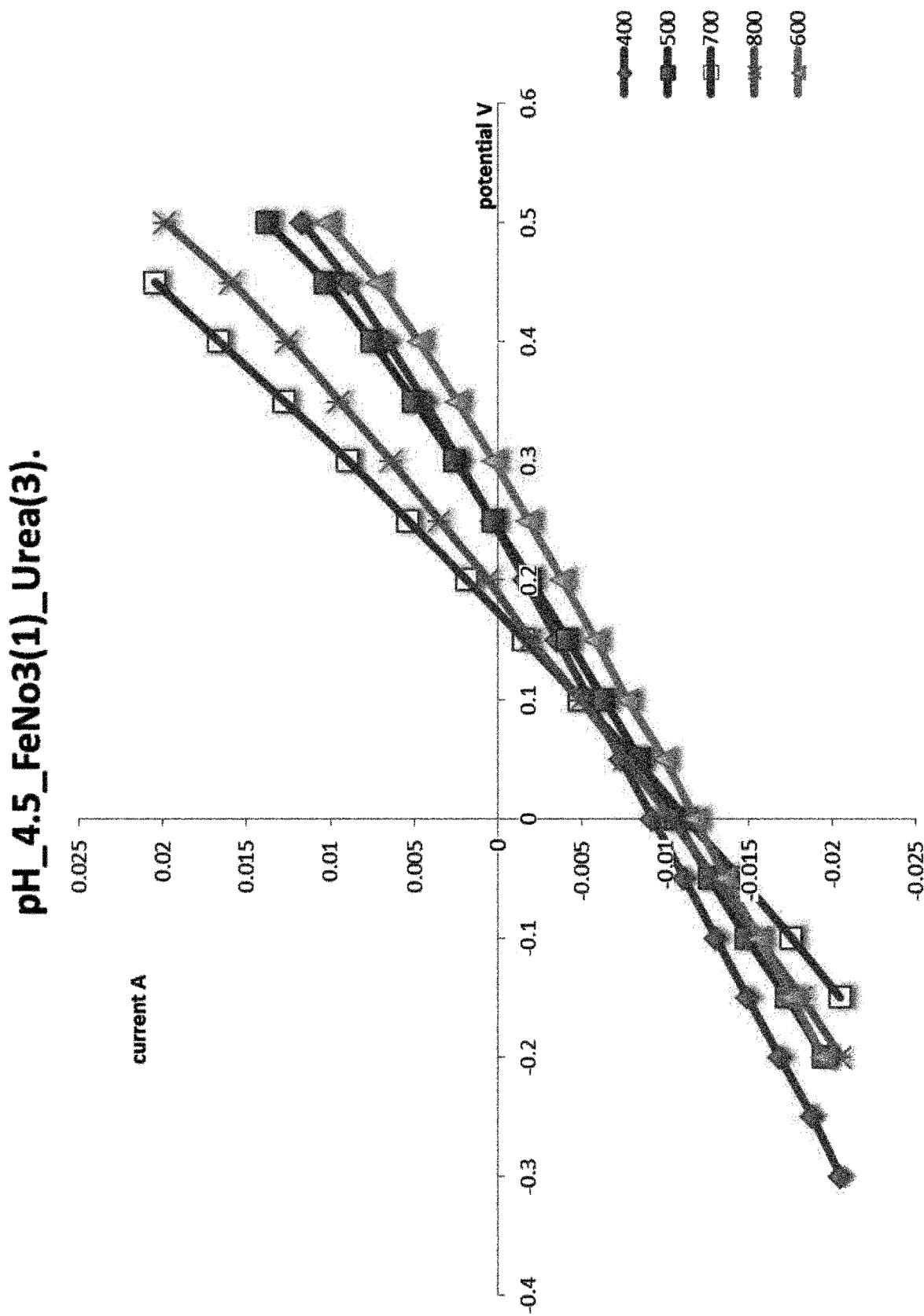

[Fig. 5B]
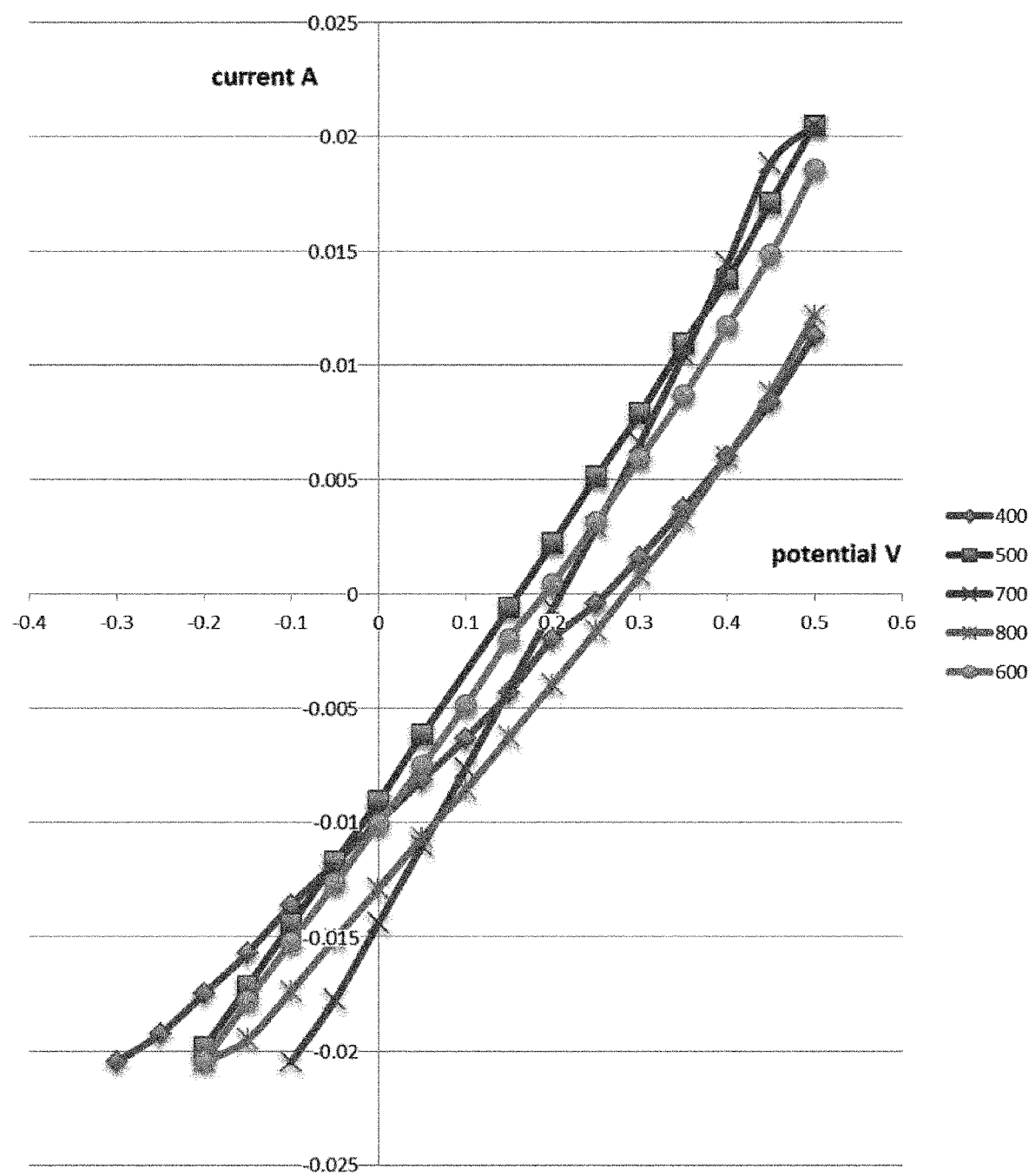

[Fig. 6]
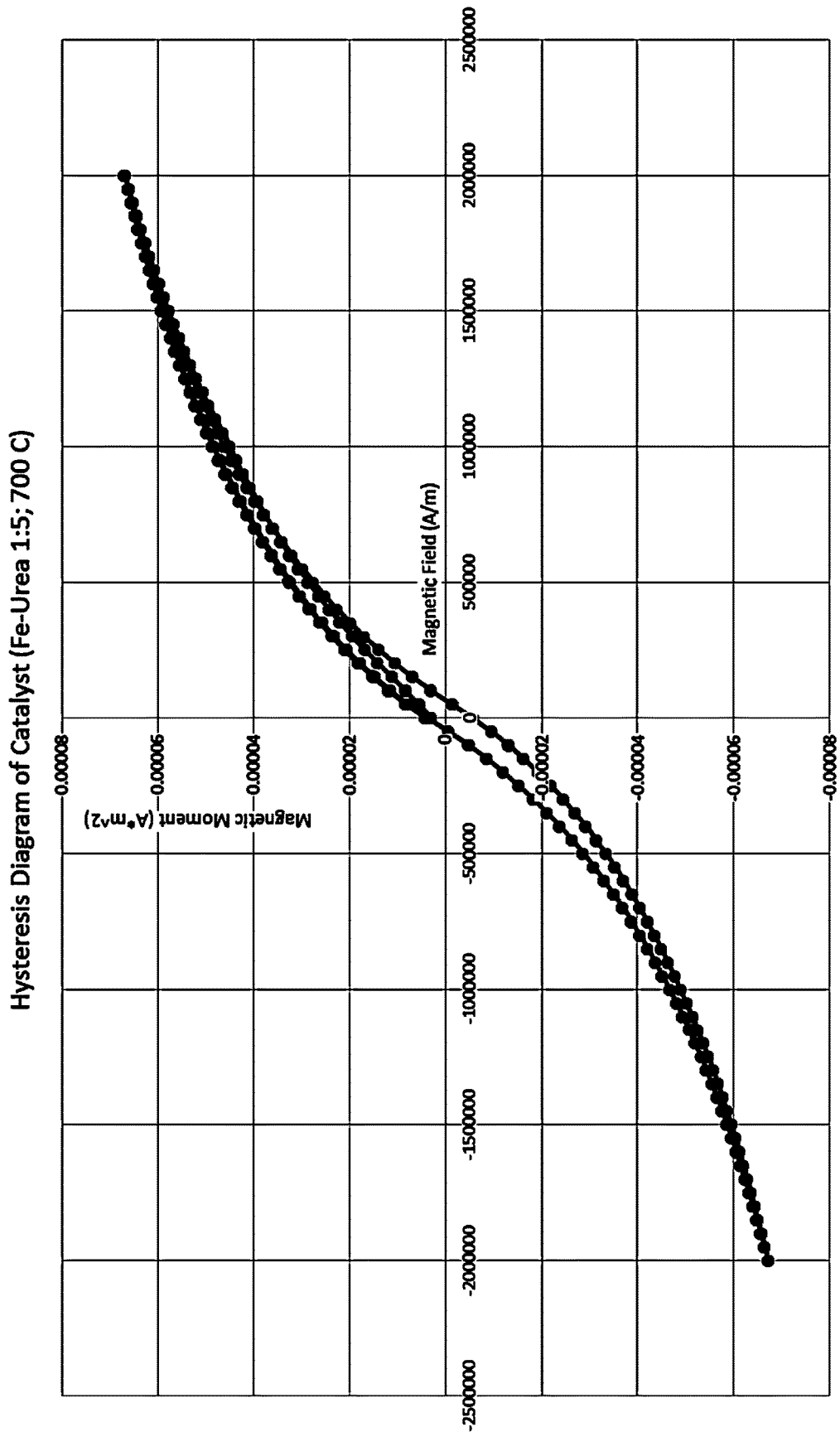

[Fig. 7]
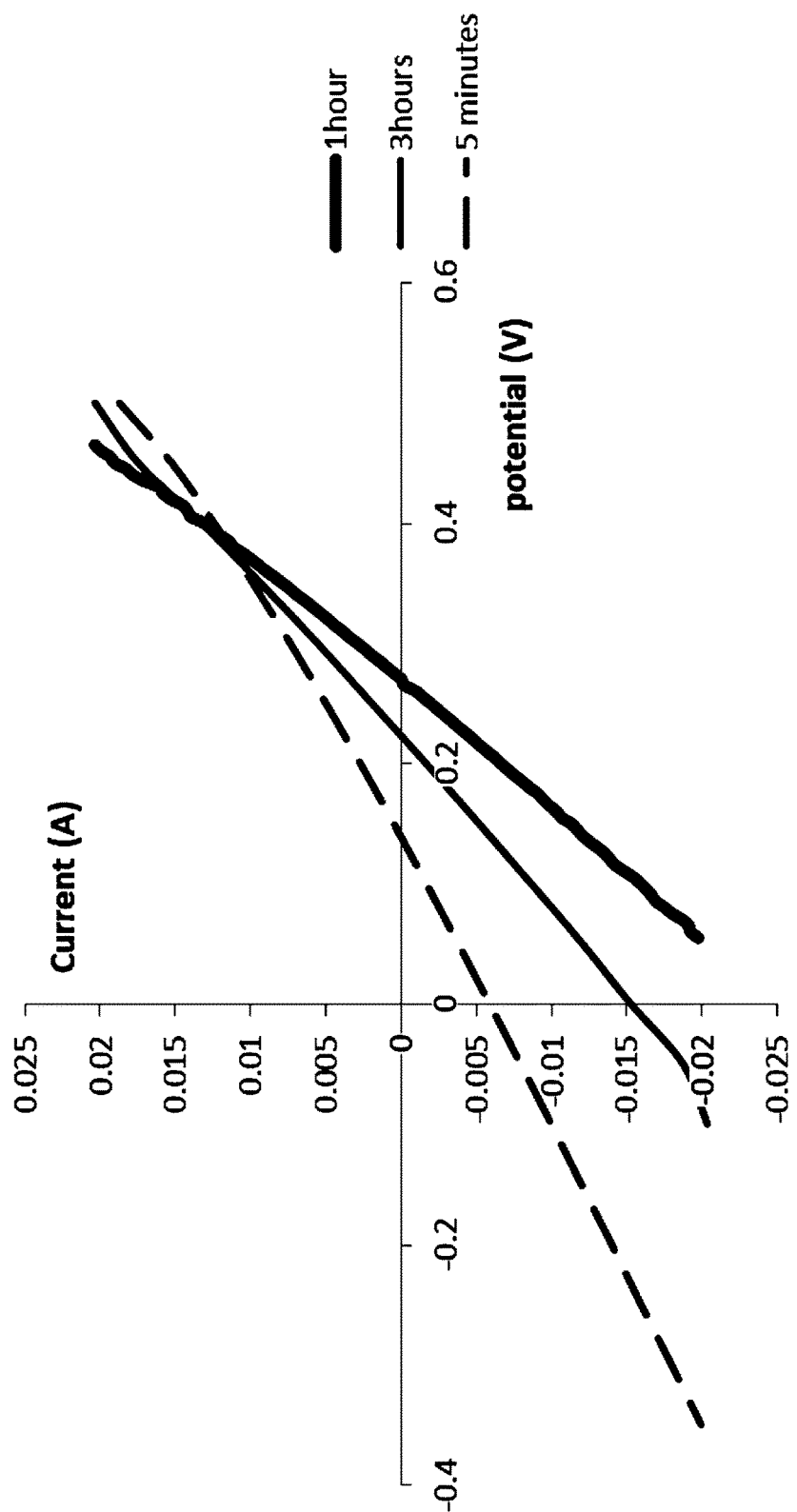

PROCESS FOR PREPARING A SUPPORTED CATALYTIC MATERIAL, AND SUPPORTED CATALYTIC MATERIAL

TECHNICAL FIELD

The present invention relates to a process for preparing a supported catalytic material, and a supported catalytic material.

BACKGROUND ART

Microbial fuel cells (MFCs) are devices, which converts chemical energy of compounds into electricity using microorganisms. Like a chemical fuel cells they contains anodic and cathodic zones separated in most cases by ion exchange membrane. The oxygen reduction reaction (ORR) is widely used cathodic reaction in fuel cells, which is enhanced by appropriate catalyst. Catalytic materials based on precious metals give the highest catalytic activity. However one of the limiting factors for commercialization of microbial fuel cells is the cost associated with precious metals.

In recent years, a variety of non-platinum catalysts for ORR have been identified and investigated. Among them cobalt or iron phthalocyanines are most investigated substances. These substances show comparable with platinum catalytic activity with respect to ORR. However such kind of catalysts is able to work in acid conditions only for the short time because of chemical reactions with acids. The heat treatment at high temperatures of these compounds was found as a way out from this situation. For example, heat treated iron(II) phthalocyanine can work in acids condition more than 1 year without loss of its activity. The well known non-platinum electrocatalysts are supported on high surface area of carbon materials. The heat treatment of metal-containing compounds together with nitrogen-containing compounds and carbon support makes possible the creation of special metal-nitrogen-carbon (M/N/C) complexes which possess catalytic activity with respect to ORR. At the moment there are several methods of fabrication of supported catalytic materials which use inexpensive precursors.

Regarding to a method of fabrication of supported catalytic material for ORR, Japanese Unexamined Patent Publication No. 2016-038988, WO 2014062639 Al Japanese Unexamined Patent Publication No. 2014-196239, and Japanese Unexamined Patent Publication No. 2016-37404 are known.

CITATION LIST

Patent Literature

[PTL 1] Japanese Unexamined Patent Publication No. 2016-038988
[PTL 2] WO 2014062639 Al
[PTL 3] Japanese Unexamined Patent Publication No. 2014-196239
[PTL 4] Japanese Unexamined Patent Publication No. 2016-37404

SUMMARY OF INVENTION

Technical Problem

However, an easier and lower-cost process for preparing a catalyst for the oxygen reduction reaction (ORR) is needed.

Hence, the present invention is intended to provide an easy and low-cost process for preparing a supported catalytic material used as a catalyst for the oxygen reduction reaction (ORR), for example, in a microbial fuel cell.

Solution to Problem

In order to achieve the above object, the present invention provides a process for preparing a supported catalytic material. The process comprises the step of: heating a precursor of support material impregnated with a mixture of chemical precursors. The mixture of chemical precursors includes a nitrogen-containing reducing reagent as a precursor and a transition metal-containing compound as a precursor.

The present invention also provides a supported catalytic material which prepared by the process of the present invention. The supported catalytic material has a surface comprising iron, nitrogen oxygen and carbon in following atomic percent content: Fe 0.23-11.22; C 43-94; O 4.7-42.68; N 0.2-2.78.

Advantageous Effects of Invention

According to the process of the present invention, a supported catalytic material can be prepared easily and at low-cost. The supported catalytic material, for example, can be used for a microbial fuel cell.

BRIEF DESCRIPTION OF DRAWINGS

FIG. 1 illustrates a graph regarding electrochemical comparison of catalytic properties of two types of supported catalytic materials for ORR. The solid line represents the supported catalytic material based on heat treated birch activated carbon and iron(II) phthalocyanine. The dashed line represents the supported catalytic material based on heat treated coconut shell charcoal, iron(III) nitrate and urea. Sweep rate 10 mV/sec.

FIG. 2 illustrates a graph regarding optimization of catalytic properties of supported catalytic material based on heat treated coconut shell charcoal, iron(III) nitrate and urea by the variation of molar ratio iron/urea. The thin solid line represents the half voltammogram corresponding to the ratio iron/urea 1:7. The dashed line represents the half voltammogram corresponding to the ratio iron/urea 1:5. The bold solid line represents the half voltammogram corresponding to the ratio iron/urea 1:3. Sweep rate 10 mV/sec.

FIG. 3 illustrates half-voltammograms for comparison of the power generated by microbial fuel cell using different cathodic supported catalytic materials. The bold solid line represents the power generated by microbial fuel cell with supported catalytic material based on heat treated birch activated carbon and iron(II) phthalocyanine. The thin solid line represents the power generated by microbial fuel cell with supported catalytic material based on heat treated coconut shell charcoal, iron(III) nitrate and urea.

FIG. 4 illustrates half-voltammograms for electrochemical catalytic activity for ORR when the precursor of supported material is pine wood. The bold solid line represents the half voltammogram corresponding to catalytic activity of heat treated pine wood material. The thin solid line represents the half voltammogram corresponding to catalytic activity of supported catalytic material based on heat treated pine wood, iron(III) nitrate and urea.

FIG. 5A illustrates half-voltammograms of supported catalytic materials described in Example 5 obtained at different heat treatment temperatures measured in buffer with pH 4.5.

FIG. 5 B illustrates a graph half-voltammograms of supported catalytic materials described in Example 5 obtained at different heat treatment temperatures measured in buffer with pH 8.

FIG. 6 shows magnetic susceptibility data for the sample described in Example 6.

FIG. 7 illustrates half-voltammograms of supported catalytic materials described in Example 7 obtained at three different times of exposure at maximal heat treatment temperature.

DESCRIPTION OF EMBODIMENTS

For the sake of clarity, in the present application, the term "catalytic material" is used to refer to compounds which result from pyrolysis of a mixture of chemical precursors but without support material. The term "supported catalytic material" is any material which comprises a support material and a catalytic material on the surface and/or inside of the support material.

Terms used in the present specification each have a meaning commonly used in the art, unless otherwise stated.

In the process of the present invention, the nitrogen-containing reducing reagent compound is, for example, urea.

In the process of the present invention, the transition metal-containing compound is, for example, a transition metal salt.

In the process of the present invention, the transition metal salt is, for example, a salt from the group of nitrates, nitrites or their mixture.

In the process of the present invention, the transition metal salt, for example, contains iron or cobalt as a transition metal.

In the process of the present invention, the precursor of support material is, for example, a material that can be transferred into porous conductive material by pyrolysis.

In the process of the present invention, the precursor of support material is, for example, containing carbon as a major constituent.

In the process of the present invention, the precursor of support material is, for example, a wood material.

In the process of the present invention, the precursor of support material is, for example, a pine wood or a birch wood.

In the process of the present invention, the heating step is, for example, conducted at heating temperature 400-800° C.

In the process of the present invention, the heating step is, for example, conducted at heating temperature 700° C.

In the process of the present invention, the heating step is, for example, conducted during 1 hour.

In the process of the present invention, the process, for example, further comprises the step of: heating up from room temperature to the heating temperature before the heating step, wherein an atmosphere is self-generated during the heating up step.

In the process of the present invention, the heating up step is, for example, conducted during 1 hour.

In the process of the present invention, the atmosphere is, for example, self-generated at pressure 5-15 Pa at the temperature of 200-300° C. during 15 minutes.

In the process of the present invention, the supported catalytic material, for example, has better electrochemical catalytic activity at alkaline pH of the electrolyte.

In the process of the present invention, the supported catalytic material, for example, has magnetic properties facilitating the control of the concentration of supported catalytic material in space by means of an external magnetic field.

In the process of the present invention, the supported catalytic material is, used for a microbial fuel cell.

<Process for Preparing a Supported Catalytic Material>

As described above, the process of the present invention is a process for preparing a supported catalytic material. The process comprises the step of: heating a precursor of support material impregnated with a mixture of chemical precursors. The mixture of chemical precursors includes a nitrogen-containing reducing reagent as a precursor and a transition metal-containing compound as a precursor.

Accordingly, the process of the present invention contains the following steps:

preparation of the solutions, which contain precursor compounds (mixture of chemical precursors); preparation of a precursor of support material; impregnation of the precursor of support material with the solution of precursor compounds; heat treatment of the mixture of the precursor compounds and the support material using specific temperature profile and variable atmosphere. Here, main criterion of the choice of materials and technological processes is, for example, low cost. By heat treatment of the mixture of the precursor compounds and the precursor of the support material, the supported catalytic material can be prepared.

In the process of the present invention, the process can use a wider class of chemical precursors and precursors of support materials, for example, simple and low-cost precursors, thus the process of the present invention can prepare a supported catalytic material easily and at low-cost.

The prepared supported catalytic material is, for example, a catalyst for the oxygen reduction reaction (ORR) as a cathodic reaction, preferably in a microbial fuel cell. Moreover, the supported catalytic material, for example, has better electrochemical catalytic activity at alkaline pH of the electrolyte, preferably at pH higher than 7, more preferably at pH of 8.

The prepared supported catalytic material, for example, has magnetic properties.

(Transition Metal-Containing Compound)

In the process of the present invention, a transition metal-containing compound is used as a chemical precursor. The transition metal-containing compound, for example, includes transition metal salt (transition metal-containing salt) hemoglobin, hemocyanin, or hemin, preferably, transition metal salt. The transition metal salt is not limited as long as it contains a transition metal from the collomn VIII of Mendeleev's table of elements. The transition metal, for example, includes iron, cobalt, nickel, platinum, palladium, iridium, ruthenium, rhodium or osmium. The transition metal salt is not particularly limited and may be a nitrate, nitride, nitrile or nitrite salt of transition metals from the collomn VIII of Mendeleev's table of elements, or their mixture. The transition metal salt may contain iron, cobalt, nickel, platinum, palladium, iridium, ruthenium, rhodium or osmium as a transition metal. Preferably, the transition metal salt is cobalt(III) salts or iron(III) salts, or their mixture.

(Nitrogen-Containing Reducing Reagent)

In the process of the present invention, a nitrogen-containing reducing reagent is used as a chemical precursor. The nitrogen-containing reducing reagent reduces metals which were in oxidized state (for example, $Fe^{-3}$ into $Fe^{+2}$). The nitrogen-containing reducing reagent may be used as long as they contain nitrogen and can reduce metals which were in oxidized state. Examples thereof include urea, imidazolidinyl urea (IMDZU) or diazolidinyl urea (DAZU).

Contrary to the substances described in other literatures, a class of the compounds (nitrogen-containing reducing reagents) is wider. Because of the simplest and inexpensive, urea is preferred.

(Mixture of Chemical Precursors)

In the process of the present invention, a mixture of chemical precursors includes the nitrogen-containing reducing reagent as described above and the transition metal-containing compound (preferably, the transition metal salt) as described above. With the mixture of chemical precursors is impregnated a precursor of support material. The impregnation may be conducted by, for example, soaking the precursor of support material in the solution of the chemical precursors. The solution of the chemical precursors may be prepared by dissolving the chemical precursors in an appropriate solvent. The solvent may be water, alcohols, hydrocarbons and other organic solvents, preferably water. For example, the final solution of the chemical precursors (the mixture of chemical precursors) may be obtained just by adding deionized water of room temperature to dry components. Contrary to other literatures, no special mixing or drying of precursors is needed. This mixture may be introduced into a precursor of support material by simply soaking the precursor of support material in the mixture.

The dry mixture of these compounds (the chemical precursors) maybe prepared with the appropriate molar ratio of a transition metal-containing compound to a nitrogen-containing reducing reagent. When a nitrogen-containing reducing reagent is urea, the molar ratio (transition metal-containing compound/urea) is, for example, within the range of 1:3 to 1:7; 1:3 to 1:5, preferably, equal to 1:5. This ratio (1:5) gives maximal catalytic activity.

(Precursor of Support Material)

In the process of the present invention, a precursor of support material is impregnated with the mixture of chemical precursors and heated during the heating step. By heat treatment, the precursor of support material converts to a support material, which supports catalytic material on its surface and/or inside. As a precursor of support material, any material, which is able to soak the solution of above described chemical precursors and which is, for example, carbonized or which can be carbonized by means of heat treatment.

The class of materials which is carbonized or can be carbonized is sufficiently wider than that, which claimed in other literatures. Among this class there are inexpensive materials with very low content of nitrogen such as cardboard or different types of wood. Traditional inexpensive materials like charcoals are applicable as precursors of support materials. For example, the precursor of support material may be a material which can be transferred into porous conductive material by pyrolysis. As the precursor of support material, all wooden materials, preferably pine wood or birch wood or coconut shell can be used. The carbonized materials may be also used as the precursor of support material. As the carbonized materials, different types of wooden charcoals can be used.

When the precursor of support material is a material which can be carbonized by means of heat treatment, carbonization may be conducted by the heat treatment of the heating step or may be conducted by another heat treatment before the heat treatment of the heating step. The precursor of support material is, preferably, pine or birch wood or coconut shell.

In the process of the present invention, a precursor of support material is impregnated with the mixture of chemical precursors before the heating step. The impregnation may be conducted by, for example, soaking the precursor of support material in the solution of chemical precursors. In the impregnation, the solution with the supported material may be stored, for example, at room temperature for 30 min.

(Heating Step)

In the heating step according to the process of the present invention, the precursor of support material impregnated with the mixture of chemical precursors is subjected to heat treatment (such as pyrolysis). The heat treatment procedure is, for example, carried out using specific temperature profile and variable anoxic atmosphere. The heat treatment procedure may be carried out under reduced pressure.

In some preferred embodiments, at the first stage, the linear increase of temperature up to the heating temperature may be applied during specific time, for example, 5 min to 3 hours, preferably 1 hour. The heating temperature is not particularly limited, may be within the range of 400° C. to 800° C., preferably 700° C. At the first stage, for example, at the temperature less than 200° C. the dehydration of precursor takes place. The pressure at this stage is, for example, 7 Pa. At the temperature of 400° C., for example, the pressure inside the vacuum chamber increased up to 10 Pa and traces of ammonia were detected. For example, contrary to other literatures, the necessary micro atmosphere of ammonia generates in porous of precursor of support material due to urea decomposition. For example, the atmosphere is self-generated at pressure 5-15 Pa at the temperature of 200-300° C. during 15 minutes. This first stage is also referred to as the heating up step.

In examples of the heat treatment, after the first stage, the maximum temperature may be maintained during specific time, for example, 5 min to 5 hours, preferably 1 hour. Then, the resulting product may be allowed to cool down to the room temperature, preferably, under reduced pressure. The cooling down procedure may take, for example, 4 to 8 hours, preferably 4 hours.

By the above heating step, the supported catalytic material is prepared. The prepared supported catalytic material has a catalytic activity. The prepared supported catalytic material, for example, has magnetic properties. Because of the magnetic properties, the supported catalytic material prepared by the process of the present invention facilitates the control of the concentration of supported catalytic material in space by means of an external magnetic field. To be more specific, by means of external magnet we can control the force of attachment of the granules of supported catalytic material. By variation of this force we can vary the local concentration of catalyst by means of the tightness of granules of supported catalytic material.

<Supported Catalytic Material>

As described above, the supported catalytic material of the present invention is prepared by the process of the present invention. The supported catalytic material, for example, has a surface comprising iron, nitrogen oxygen and carbon in following atomic percent content: Fe 0.23-11.22; C 43-94; O 4.7-42.68; N 0.2-2.78.

As to the supported catalytic material of the present invention, for example, the above descriptions regarding the process of the present invention can be mentioned.

The present invention is described in detail below with reference to examples. It is to be noted, however, that the present invention is not limited thereto.

EXAMPLES

Equipment and Instrumentation:

EYELA KDF-V50R vacuum furnace was used in all Examples. Coconut shell charcoal was supplied by Osaka Gas Chemicals (Japan). Remaining chemicals were supplied by Wako Pure Chemicals (Japan) and used without additional purification. Uniscan Instruments (UK) potentiostat was used for electrochemical characterization. Magnetic susceptibility was measured using Quantum Design (USA) DynaCool-95R machine and XPS spectra were registered using Kratos Axis Ultra x-ray photoelectron spectrophotometer with mono (Al) x-ray source operating at anode voltage of 15 kV and emission current 10 mA (150 W). The catalyst surface was analyzed through a hybrid lens (700 um×300 um analysis area). Data was processed using CasaXPS processing software (Tougaard background).

Example 1

In this experiment the catalytic activity of ORR was compared for two supported catalytic-materials. For the first one, the birch activated carbon as a precursor of support material and iron(II) phthalocyanine as a chemical precursor were used (comparative example). For the second one the coconut shell charcoal as a precursor of support material and iron(III) nitrate and urea as chemical precursors were used (example).

The coconut shell charcoal and birch activated carbon were prepared in the following manner. Both charcoals were soaked in an excess of distilled water and drained to remove charcoal dust. Fresh distilled water was added in excess to the rinsed charcoals and the pH was adjusted (7.0) with concentrated hydrochloric acid. The charcoal suspensions were boiled for 1 hour, then it was allowed to cool and drained. The air-dried charcoals were heated under vacuum to 60° C. for 2 hours.

<Catalyst Solutions>
(Iron-Urea Solution)

To 77 mL of distilled water was added 3.6 g (9 mmol) of iron(III) nitrate nona hydrate. The mixture was stirred to dissolve the iron(III) nitrate. To the resulting orange solution was added 4.8 g (80 mmol) of urea. The resulting solution was poured over 150 mL of vacuum-dried coconut shell charcoal in a 500-mL crucible (see above). The catalyst-charcoal mixture was stored at room temperature for 30 minutes.

(Iron(II) Phthalocyanine Solution)

To 100 mL of N-Methylpyrrolidone was added 5 g iron(II) phthalocyanine. The mixture was stirred to dissolve the iron(II) phthalocyanine. The resulting solution was poured over 150 mL of vacuum-dried birth activated carbon in a 500-mL crucible. The catalyst-charcoal mixture was stored at room temperature for 30 minutes. The concentration of iron was the same in both solutions.

<Pyrolysis>

The coconut shell charcoal saturated with the iron(III) nitrate and urea solution was heated in a vacuum furnace. The heat treatment procedure was carried out using special temperature profile and variable anoxic atmosphere. At the first stage the linear increase of temperature up to 700° C. was applied during one hour. At the first stage, at the temperature less than 200° C. the dehydration of precursor took place. The pressure at this stage was 7 Pa. At the temperature of 400° C. the pressure inside the vacuum chamber increased up to 10 Pa and traces of ammonia was detected in the out gases. After reaching the temperature of 700° C. then it was maintained during 1 hour.

The cooling down procedure from 700° C. to 200° C. took 4 hours in vacuum.

Then the final supported catalytic material was allowed to cool slowly under vacuum to room temperature.

The same temperature profile and anoxic atmosphere (7 Pa) were applied to mixture of birch activated carbon and the iron(II) phthalocyanine. However, no ammonia was detected in the out gases.

<Electrochemical Analysis>

The comparison of catalytic properties of two types of supported catalytic materials for ORR was carried out using potentiostat and aerated three electrode electrochemical cell. The working electrode represented a perforated polymeric cylinder with a volume of 14 ml. The diameter of holes in the cylinder was less than average diameter of granules of supported catalytic material. The cylinder was filled with granules of supported catalytic material and tightly pressed by the upper lead, which had a metal electrical connector. Electrochemical tests were carried out in 0.1 M phosphate buffer solution at pH=4.5. The results of comparison are illustrated by FIG. 1. FIG. 1 contains half-voltammograms for both supported catalytic materials.

<Conclusion>

The catalytic activity which derived from the slopes of the curves is nearly two-fold higher for the precursors-iron(III) nitrate, urea and coconut shell charcoal rather than the reference catalyst based on iron(II) phthalocyanine and birch activated carbon. This point is additionally illustrated by a significantly higher current at the same negative potential.

Example 2

The influence of initial urea concentration on the final catalytic properties of the supported catalytic material was investigated.

The coconut shell charcoal was prepared in the same manner as in Example 1.

<Catalyst Solutions>

Three solutions with chemical precursors were prepared:
1. A mixture of 17.0 g of iron(III) nitrate nonahydrate and 7.2 g of urea was dissolved in 77 mL of distilled water which resulting molar ratio iron/urea 1:3.
2. A mixture of 17.0 g of iron(III) nitrate nonahydrate and 12.0 g of urea was dissolved in 77 mL of distilled water which resulting molar ratio iron/urea 1:5.
3. A mixture of 17.0 g of iron(III) nitrate nonahydrate and 16.8 g of urea was dissolved in 77 mL of distilled water which resulting molar ratio iron/urea 1:7.

Then resulting solutions was poured over 150 mL of vacuum-dried coconut shell charcoal in a 500-mL crucible. The catalyst-charcoal mixtures were stored at room temperature for 30 minutes.

<Pyrolysis>

Pyrolysis of three catalyst-charcoal mixtures was done in the same manner as in Example 1.

<Electrochemical Analysis>

Electrochemical analyses were carried out in the same electrochemical cell as in Example 1. The liquid phase (electrolyte solution) was represented by 0.1 M phosphate buffer solution at pH=8. The results of comparison are illustrated by FIG. 2. FIG. 2 contains half-voltammograms of each supported catalytic materials.

<Conclusion>

The catalytic activity which follows from the slops and intercepts of the curves is better for iron-urea molar ratio 1:5.

Example 3

Testing of the different types of supported catalytic materials in the working microbial fuel cell.

The microbial fuel cell for this test consisted of one anodic chamber inoculated with anaerobic sludge and two air breathing cathodic electrodes attached to both sides of anodic chamber. The volume of anodic chamber was 150 ml.

Anodic and cathodic compartments were separated by ion exchange membrane. The supported catalytic material was attached to cathodic electrode, which serves as collector of electricity also. Two types of supported catalytic materials were used. Type 1 was attached to cathodic electrode on the left side of anodic zone, type 2 was attached to cathodic electrode on the right side of anodic zone.

For the first type the birch activated carbon as a precursor of support material and iron(II) phthalocyanine as a chemical precursor were used (comparative example). For the second type the coconut shell charcoal, iron(III) nitrate and urea were used as precursors (comparative example). Both supported catalytic materials were prepared using the same concentration and technology of manufacturing as in Example 1. The amount of supported catalytic materials of two types that was attached was the same and equal to 35 ml. The pH of cathodic electrolyte on both sides was 7.

FIG. 3 contains the power generated by both supported catalytic materials vs. current levels. The power values were calculated from polarization curves obtained by two electrode system where cathodic electrodes with different types of catalysts (supported catalytic materials) were used as working electrodes.

<Conclusion>

The coconut shell charcoal, iron(III) nitrate and urea as precursors for supported catalyst material generated more power than material based on birch activated carbon and iron(II) phthalocyanine.

Example 4

Electrochemical catalytic activity for ORR when the precursor of supported material is pine wood.

The iron-urea solution was prepared according to the following procedure. To 15 mL of distilled water was added 13.6 g (33.2 mmol) of iron nitrate nonahydrate. To the resulting solution was added 9.91 g (165 mmol) of urea. A 30-mL sample of 10-mm wooden pegs with diameter of 4 mm was saturated with the iron-urea solution by soaking for 16 hours. A separate 30-mL sample of 10-mm wooden pegs with diameter of 4 mm was saturated by soaking in distilled water. Each sample of saturated wooden pegs was pyrolyzed following the temperature profile described in Example 1. The resulting carbonized material was subjected to electrochemical tests. The electrochemical tests were carried out in the same three electrode cell as in Example 1 with pH of the solution equal to 7. The results are shown on FIG. 4.

<Conclusion>

Wooden material can play the role of precursor of supporting material for final supported catalytic materials.

Example 5

The influence of maximal combustion temperature on the final catalytic properties of supported catalytic material was investigated.

The coconut shell charcoal was prepared in the same manner as in Example 1.

<Catalyst Solutions>

Two solutions with catalysts precursors were prepared:

1. A mixture of 17.0 g of iron(III) nitrate nonahydrate and 7.2 g of urea was dissolved in 77 mL of distilled water which resulting molar ratio iron/urea 1:3.

2. A mixture of 17.0 g of iron(III) nitrate nonahydrate and 9.6 g of urea was dissolved in 77 mL of distilled water which resulting molar ratio iron/urea 1:4.

Then resulting solutions was poured over 150 mL of vacuum-dried coconut shell charcoal in a 500-mL crucible. The catalyst-charcoal mixtures were stored at room temperature for 30 minutes.

<Pyrolysis>

The coconut shell charcoal saturated with the iron(III) nitrate and urea solutions with molar ratios iron/urea 1:3 and molar ratio iron/urea 1:4 was heated in a vacuum furnace under anoxic atmosphere. At the first stage the linear increase of temperature up to maximal temperature is applied during 1 hour. After reaching the maximal temperature, then it was maintained during 1 hour. The cooling down procedure from maximal temperature to 200° C. took 4 hours in vacuum. Then the final supported catalytic material was allowed to cool slowly under vacuum to room temperature. For each solution the applied maximal temperatures were: 400° C., 500° C., 600° C., 700° C., 800° C.

The electrochemical tests of obtained supported catalytic materials at different temperatures were carried out in three electrode cell in the same manner as in Example 1. The buffer solutions that were used were 0.1 M phosphate buffers at pH 4.5 for iron/urea 1:3 or pH 8 for iron/urea 1:4. The results of comparison are illustrated by FIGS. 5A-B. FIGS. 5A-B contain half-voltammograms of each supported catalytic materials obtained at different maximal temperatures. The slope of the curves was used as a criterion to compare results because the bigger value of the slop the stronger the kinetics of electrode reaction and as a consequence the less polarizability of the whole cathodic electrode.

<Conclusion>

The catalytic activity which follows from the slops of the curves is better for the maximal temperatures within the range of 400-800° C., the best for the maximal temperatures of 700° C.

Example 6

Magnetic susceptibility for the catalyst prepared at 700° C. using the 1:5 iron-urea molar ratio (prepared in the same manner as in Example 1) was measured using a Quantum Design DynaCool-9SR physical properties measurement system (PPMS) equipped with a D525 vibrating sample magnetometer (VSM) module. The applied magnetic field varied from −2,000,000 A/m to +2,000,000 A/m at intervals of 50,000 A/m. The measurement temperature was maintained at 300 K. The powdered sample mass was 6.9 mg. The result is shown on FIG. 6.

<Conclusion>

The results of the magnetic susceptibility measurements indicate that the magnetic remanence of the sample with no applied magnetic field is $4.69 \times 10^{-6}$ $A*m^2$ and the coercively or required field reversal after saturation for the sample is 49851 A/m. That clearly shows that the obtained material has pronounced magnetic properties.

Example 7

The choice of the optimal temperature profile of combustion for the creation of supported catalytic material.

In Example 5 it was shown that the maximal temperature of combustion 700° C. was optimal from point of view of half-voltammograms slopes, which characterizes the polarizability of the whole cathodic electrode. In present Example the time of exposure at maximal temperature was varied.

<Materials>

The coconut charcoal was prepared in the same manner as in Example 1.

A mixture of 17.0 g of iron(III) nitrate nonahydrate and 12.0 g of urea was dissolved in 77 mL of distilled water which resulted the molar ratio iron/urea 1:5. This solution was used to saturate coconut shell charcoal.

<Temperature Profile of Combustion>

In all experiments, the first stage of the linear increase of temperature up to maximal temperature of 700° C. was the same. The duration of the first stage was 1 hour. After reaching the maximal temperature of 700° C., this temperature was maintained during three different periods of times in three different experiments. These periods were: 3 hours, 1 hour, and 5 minutes. The cooling down procedure from maximal temperature to 200° C. took 4 hours and was the same in all experiments. Then the final supported catalytic material was allowed to cool slowly under vacuum to room temperature.

The electrochemical tests of obtained supported catalytic materials were carried out in three electrode cell in the same manner as in Example 1. The buffer solution that was used was 0.1 M phosphate buffers at pH 8. The results of comparison are illustrated by FIG. 7. FIG. 7 contains half-voltammograms of each supported catalytic materials obtained at three different times of exposure at maximal temperature. The criterion of comparison was the value of the slope of half-voltammograms.

<Conclusion>

The time of 1 hour is optimal time of exposure at maximal temperature for receiving supported catalytic material.

Example 8

Comparison of the elemental composition of the surface of the samples prepared with different heat treatment temperatures and iron/urea loadings All samples were prepared according to procedure described in Example 1 and only $Fe(NO_3)_3$ and urea loadings were varied. Samples after heat treatment were used as solid unground blocks and measure using X-ray photoelectron spectroscopy to characterize the sample surface composition. The data is shown in Table 1. Instrument description provided in the Examples section.

While the present invention has been described above with reference to illustrative embodiments and examples, the present invention is by no means limited thereto. Various changes and modifications that may become apparent to those skilled in the art may be made in the configuration and specifics of the present invention without departing from the scope of the present invention.

The invention claimed is:

1. A process for preparing a supported catalytic material, comprising the steps of:
    a heating up step of heating from room temperature, wherein an atmosphere is self-generated at a pressure of 5-15 Pa at a temperature of 200-300° C. for 15 minutes during the heating up step, and then
    a heating step of heating a precursor of support material impregnated with a mixture of chemical precursors, wherein the mixture of chemical precursors comprises a nitrogen-containing reducing reagent as a precursor and a transition metal-containing compound as a precursor.

2. The process of claim 1, wherein the nitrogen-containing reducing reagent compound is urea.

3. The process of claim 1, wherein the transition metal-containing compound is a transition metal salt.

4. The process of claim 3, wherein the transition metal salt is a salt selected from the group consisting of a nitrate, a nitrite and mixtures thereof.

5. The process of claim 4, wherein the transition metal salt contains iron or cobalt as a transition metal.

6. The process of claim 1, wherein the precursor of support material is a material that can be transferred into a porous conductive material by pyrolysis.

7. The process of claim 6, wherein the precursor of support material is a wood material.

8. The process according to claim 6, wherein the precursor of support material contains carbon as a major constituent.

9. The process of claim 1, wherein the heating step is conducted at a heating temperature of 400-800° C.

10. The process of claim 9, wherein the heating step is conducted for a duration of 1 hour.

11. The process according to claim 7, wherein the wood material is a pine wood or a birch wood.

TABLE 1

Elemental composition of the materials surface at various pyrolysis temperatures and iron/urea loadings.

| Loading $Fe(NO_3)_3 \cdot 9H_2O$ | Loading Urea | T = 400° C. | T = 500° C. | T = 600° C. | T = 700° C. | T = 800° C. |
|---|---|---|---|---|---|---|
| 10.1 g (0.025 mol) | 6.0 g (0.1 mol) (iron: urea = 1:4) | C: 43.57% N: 2.53% O: 42.68% Fe: 11.22% | C: 60.51% N: 2.26% O: 29.60% Fe: 7.64% | C: 74.85% N: 1.31% O: 18.83% Fe: 5.01% | C: 75.16% N: 1.47% O: 19.00% Fe: 4.38% | C: 92.71% N: 0.30% O: 5.75% Fe: 1.24% |
| 13.4 g (0.033 mol) | 6.0 g (0.1 mol) (iron: urea = 1:3) | C: 48.40% N: 2.78% O: 39.43% Fe: 9.39% | C: 49.18% N: 1.24% O: 38.76% Fe: 10.82% | C: 93.50% N: 0.42% O: 5.21% Fe: 0.87% | C: 93.56% N: 0.25% O: 5.13% Fe: 1.05% | C: 90.26% N: 0.50% O: 7.61% Fe: 1.62% |
| 20.2 g (0.05 mol) | 6.0 g (0.1 mol) (iron: urea = 1:2) | N/A | N/A | C: 67.07% N: 1.94% O: 24.64% Fe: 6.36% | C: 63.50% N: 0.31% O: 27.98% Fe: 8.21% | C: 93.89% N: 0.22% O: 4.77% Fe: 1.12% |
| Reference sample of support material not treated with either iron or urea | | | | | | |
| Coconut Shell Charcoal | | T = 200° C. C: 89.92% N: 0.29% O: 9.79% | | | | |

12. The process according to claim 9, wherein the heating temperature is 700° C.

13. The process of claim 1, wherein the heating up step is conducted for a duration of 1 hour.

14. The process of claim 1, wherein the process provides the supported catalytic material with improved electrochemical catalytic activity at alkaline pH of an electrolyte compared to the precursor of support material.

15. The process of claim 1, wherein the supported catalytic material has magnetic properties facilitating the control of the concentration of supported catalytic material in space by means of an external magnetic field.

16. The process of claim 1, wherein the supported catalytic material is used for a microbial fuel cell.

17. A supported catalytic material having a surface comprising iron, nitrogen, oxygen, and carbon in the following atomic percent content: Fe 0.23-11.22; C 43-94; O 4.7-42.68; N 0.2-2.78.

* * * * *